(12) United States Patent
Guarino

(10) Patent No.: US 10,697,534 B2
(45) Date of Patent: Jun. 30, 2020

(54) VEHICLE AXLE SYSTEM

(71) Applicant: Ford Global Technologies, LLC, Dearborn, MI (US)

(72) Inventor: William David Guarino, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/879,021

(22) Filed: Jan. 24, 2018

(65) Prior Publication Data

US 2019/0226576 A1 Jul. 25, 2019

(51) Int. Cl.
| | | |
|---|---|---|
| F16H 57/04 | (2010.01) |
| F16H 48/08 | (2006.01) |
| F16H 57/037 | (2012.01) |
| F16D 13/74 | (2006.01) |
| F16D 13/52 | (2006.01) |
| F16H 48/22 | (2006.01) |
| F16D 13/64 | (2006.01) |

(52) U.S. Cl.
CPC ......... *F16H 57/0473* (2013.01); *F16D 13/52* (2013.01); *F16D 13/64* (2013.01); *F16D 13/648* (2013.01); *F16D 13/74* (2013.01); *F16H 48/08* (2013.01); *F16H 48/22* (2013.01); *F16H 57/037* (2013.01); *F16H 57/0423* (2013.01); *F16H 57/0424* (2013.01); *F16H 57/0427* (2013.01); *F16H 57/0483* (2013.01)

(58) Field of Classification Search
CPC ............. F16H 57/0473; F16H 57/0424; F16H 57/0483; F16H 57/037; F16H 48/22; F16H 57/0427; F16H 57/0423; F16H 48/08; F16H 57/0445; F16H 57/0457; F16H 2048/343; F16D 13/648; F16D 13/64; F16D 13/74; F16D 13/52; F16D 13/72

See application file for complete search history.

(56) References Cited

U.S. PATENT DOCUMENTS

| | | | |
|---|---|---|---|
| 4,736,821 A * | 4/1988 | Ries ........................ | B60T 1/062 188/264 B |
| 6,129,191 A | 10/2000 | Kummer et al. | |
| 6,568,518 B2 | 5/2003 | Sarar | |
| 9,631,680 B2 | 4/2017 | Kirchhoffer | |
| 2006/0175160 A1* | 8/2006 | Weiss ...................... | F16D 65/12 188/218 XL |

(Continued)

FOREIGN PATENT DOCUMENTS

JP H0356718 A 3/1991

*Primary Examiner* — Jacob S. Scott
*Assistant Examiner* — Lillian T Nguyen
(74) *Attorney, Agent, or Firm* — Vincent Mastrogiacomo; Brooks Kushman P.C.

(57) ABSTRACT

A vehicle axle includes a housing, differential gearing, and a first clutch. The housing defines first and second cavities. The housing also defines a channel extending between the first and second cavities. The differential gearing is disposed within the first cavity and has a carrier extending into the second cavity. The first clutch is disposed within the second cavity. The first clutch is configured to selectively couple a half-shaft to the carrier. The first clutch has friction plates that include fanned spokes positioned to draw fluid from the channel and into the second cavity.

19 Claims, 5 Drawing Sheets

(56) References Cited

U.S. PATENT DOCUMENTS

2015/0057125 A1\* 2/2015 Pump ...................... F16H 48/08
                                                                                              475/160
2015/0141192 A1\* 5/2015 Valente ............... F16H 57/0404
                                                                                              475/160

\* cited by examiner

VEHICLE AXLE SYSTEM

TECHNICAL FIELD

The present disclosure relates to powertrain systems for vehicles including axles configured to transfer power to drive wheels.

BACKGROUND

Vehicles include powertrain systems that are configured to transfer power from power generating devices, such as internal combustion engines, to drive wheels of the vehicle.

SUMMARY

A vehicle axle includes a housing, differential gearing, and a clutch. The housing defines first and second chambers. The housing also defines a channel extending between the first and second chambers. The differential gearing is disposed within the first chamber and has a differential output extending into the second chamber. The clutch is disposed within the second chamber. The clutch is configured to selectively couple a half-shaft to the differential output. The clutch has at least one friction plate that includes fanned spokes positioned to draw fluid from the channel and into the second chamber.

A vehicle axle includes a housing, differential gearing, and a first clutch. The housing defines first and second cavities. The housing also defines a channel extending between the first and second cavities. The differential gearing is disposed within the first cavity and has a carrier extending into the second cavity. The first clutch is disposed within the second cavity. The first clutch is configured to selectively couple a half-shaft to the carrier. The first clutch has friction plates that include fanned spokes positioned to draw fluid from the channel and into the second cavity.

A differential includes a housing, differential gearing, and a clutch. The housing defines first and second internal cavities. The housing also defines a channel extending between the first and second cavities. The differential gearing is disposed within the first cavity. The clutch has friction plates disposed within the second cavity. At least one of the friction plates includes fanned spokes positioned to draw fluid from the channel and into the second cavity.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
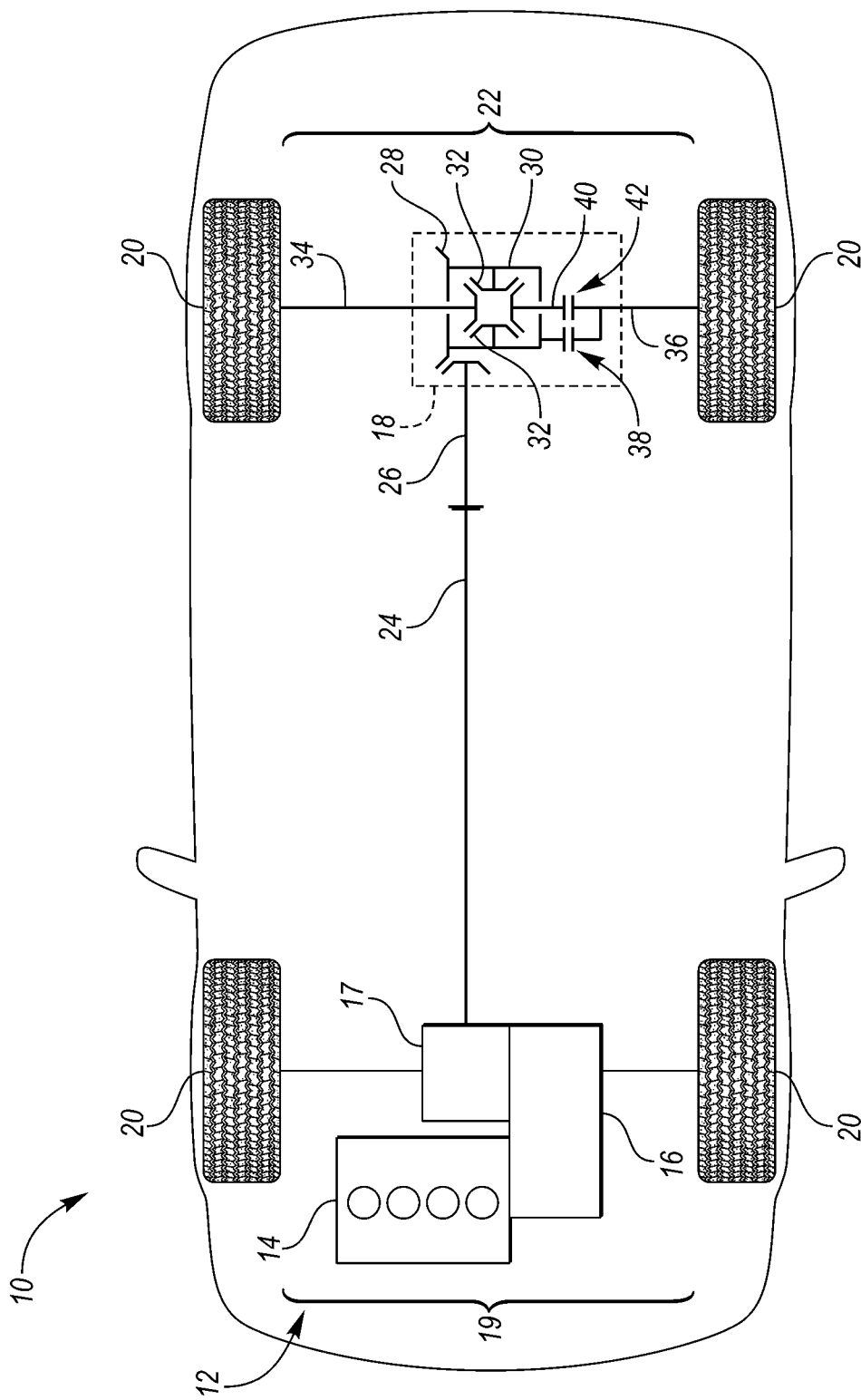
FIG. 1 is a schematic illustration of a representative vehicle including a representative powertrain of the vehicle.

Referring to FIG. 1, a vehicle 10 is illustrated. The vehicle 10 includes a powertrain 12. The powertrain 12 may include a power generator that is configured to generate torque and power within the powertrain, such as an internal combustion engine 14. The vehicle operator may request a desired torque and/or power output of the engine 14 by depressing an accelerator pedal (not shown). The powertrain 12 may further include a gearbox 16, a power transfer unit 17, a differential 18, and drive wheels 20. A torque converter (not shown) or a launch clutch (not shown) may be disposed between the engine 14 and the gearbox 16. The gearbox 16 may be a multi-ratio transmission that provides multiple gear ratios between an input and an output of the gearbox 16. The gearbox 16 may be an automatic transmission that automatically shifts between gears or a manual transmission that requires an operator to shift between gears. The gearbox 16 may also be a transaxle that includes a second differential that transfers torque and/or power to the drive wheels 20 of a front axle 19 (or primary axle). The power transfer unit 17 may be configured to transfer power and/or torque from the gearbox 16 to a rear drive unit that includes the differential 18. The differential 18 and any intermediate components disposed between the differential 18 and the drive wheels 20 may form a rear axle 22 (or secondary axle) of the powertrain 12. The drive wheels 20 may or may not be considered as part of the rear axle 22. The vehicle 10 and powertrain 12 are further described in patent application Ser. No. 15/292,569, which is hereby incorporated in its entirety by reference herein.

The gearing of the differential 18 (which may be referred to as a gearing arrangement) connects the gearbox 16 to the drive wheels 20. The gearing of the differential 18 is arranged such that opposing drive wheels 20 on a single axle may rotate at different speeds. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission, such as gearbox 16, has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one-way clutches. A clutch that holds an element against rotation by selectively connecting the element to a fixed component, such as a transmission housing, may be called a brake.

The differential 18 may be connected to an output of the gearbox 16 by a driveshaft 24. The driveshaft 24 may be affixed to an input of the differential 18. The driveshaft 24 may be affixed to the input of the differential 18 by a universal joint (not shown). The input of the differential 18 may comprise an input shaft 26. The input shaft 26 may include gearing (which may be a bevel gear) that forms a fixed gearing arrangement with a ring gear 28 that is affixed to a carrier 30 of the differential 18. Spider gears 32 (which may be bevel gears) may be rotatably secured to the carrier 30. The spider gears 32 may be rotatably secured to the carrier 30 by pins.

A first half-shaft 34 may connect the differential 18 to a first of the drive wheels 20. Although not shown, several intermediate shafts and/or universal joints may connect the first half-shaft 34 to the drive wheels 20. The first half-shaft 34 may include gearing (which may be a bevel gear) that forms a fixed gearing arrangement with the spider gears 32. The carrier 30 may be selectively coupled to a second half-shaft 36 via a first clutch 38 in order to establish a connection between the differential 18 and a second of the drive wheels 20. Although not shown, several intermediate shafts and/or universal joints may connect the second half-shaft 36 to the drive wheels 20. An intermediate shaft 40 (or stub shaft) may include gearing (which may be a bevel gear) that forms a fixed gearing arrangement with the spider gears 32. The intermediate shaft 40 may be selectively coupled to the second half-shaft 36 via a second clutch 42 in order to establish a second connection between the differential 18 and the second of the drive wheels 20.

The carrier 30 may be considered an output of the gearing of differential 18 since the carrier 30 is configured to transfer power and/or torque to the second half-shaft 36 when the first clutch 38 is in a closed or slipping state. The intermediate shaft 40 may be considered an output of the gearing of the differential 18 since the intermediate shaft 40 is configured to transfers power and/or torque to the second half-shaft 36 when the second clutch 42 is in a closed or slipping state. The gearing of the differential may include the input shaft 26, ring gear 28, carrier 30, spider gears 32, first half-shaft 34, intermediate shaft 40, and any other gearing connection between the input shaft 26 and the first half-shaft 34 and/or second half-shaft 36. The first clutch 38 may be a limited-slip clutch is configured to allow a limited amount of slipping between the carrier 30 and the second half-shaft 36 while the second clutch 42 may be a disconnect clutch that is configured to connect and disconnect the intermediate shaft 40 from the half-shaft 36.

It should be further understood that the vehicle 10 configuration described herein is also merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
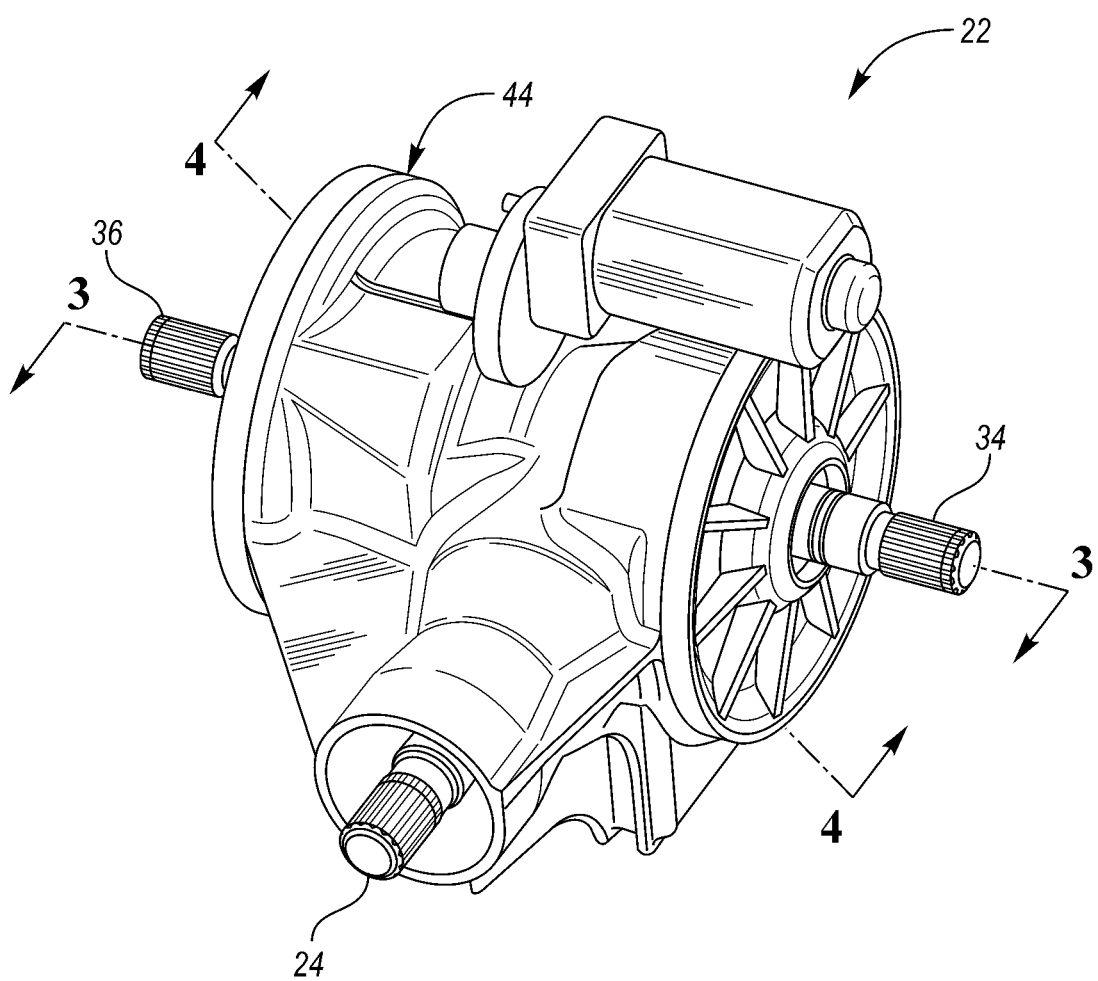
FIG. 2 is a perspective view of an axle of the powertrain.

Referring to FIG. 2, a perspective view of the rear axle 22 (excluding the drive wheels 20 and any intermediate shafts and/or universal joints between the half-shafts 34, 36 and the drive wheels 20) is illustrated. The rear axle 22 includes a housing 44 that contains the input shaft 26, ring gear 28, carrier 30, spider gears 32, a portion of the first half-shaft 34, a portion of the second half-shaft 36, intermediate shaft 40, first clutch 38, and second clutch 42. The housing 44 may also be referred to as a housing of the differential 18. The input shaft 24, first half-shaft 34, and second half-shaft 36 are shown to extend through the orifices defined by the housing 44 to an exterior of the housing 44. The input shaft 24, first half-shaft 34, and second half-shaft 36 may include splines that form rotatable connections with intermediate shafts or universal joints. Seals (not shown) may be disposed within the orifices between the housing 44 and the input shaft 24, first half-shaft 34, and second half-shaft 36 to prevent differential lubricating fluid located within the housing from leaking out of the housing 44.

Figure 3:
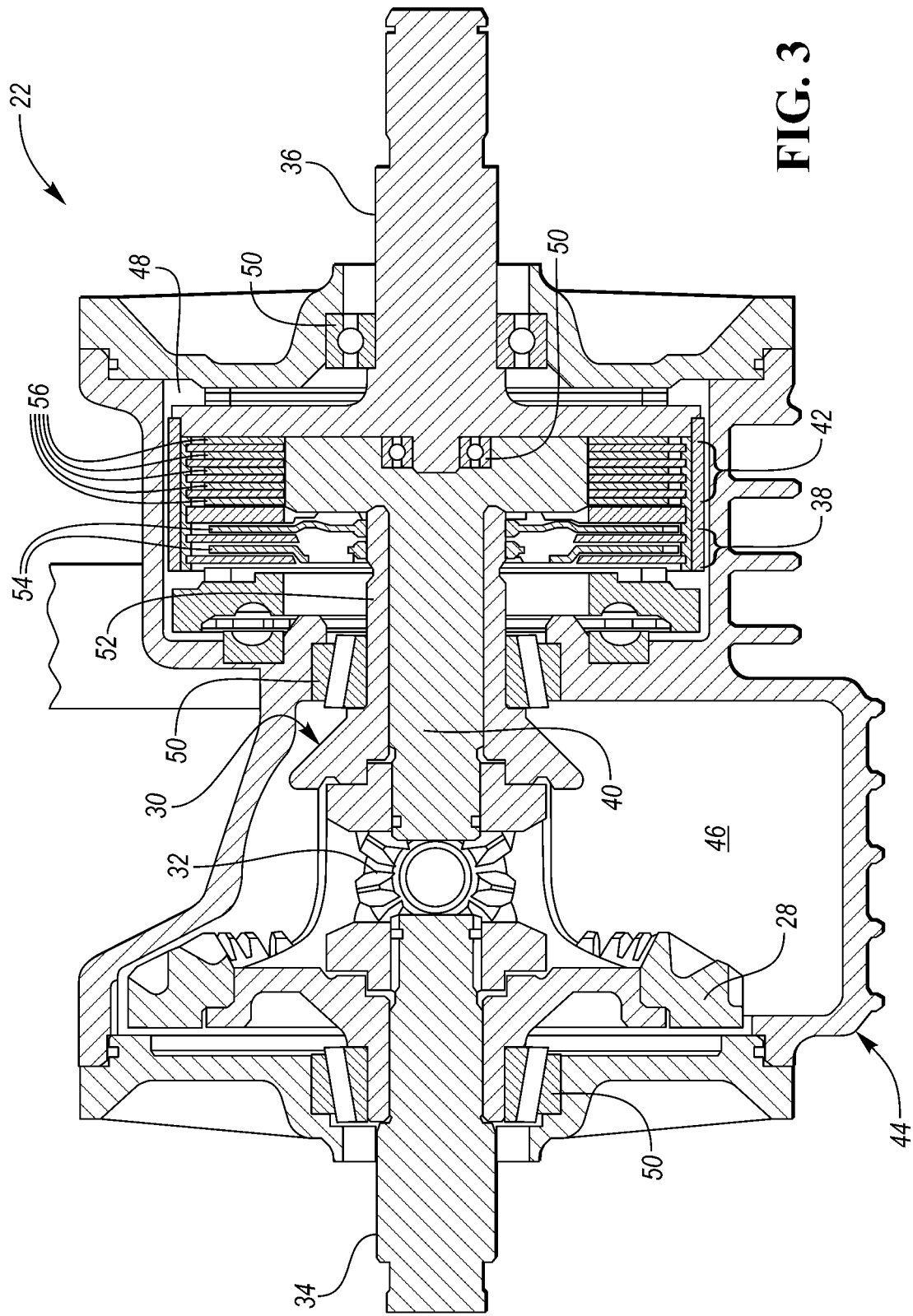
FIG. 3 is a cross-sectional view taken along line 3-3 in FIG. 2.
Figure 4:
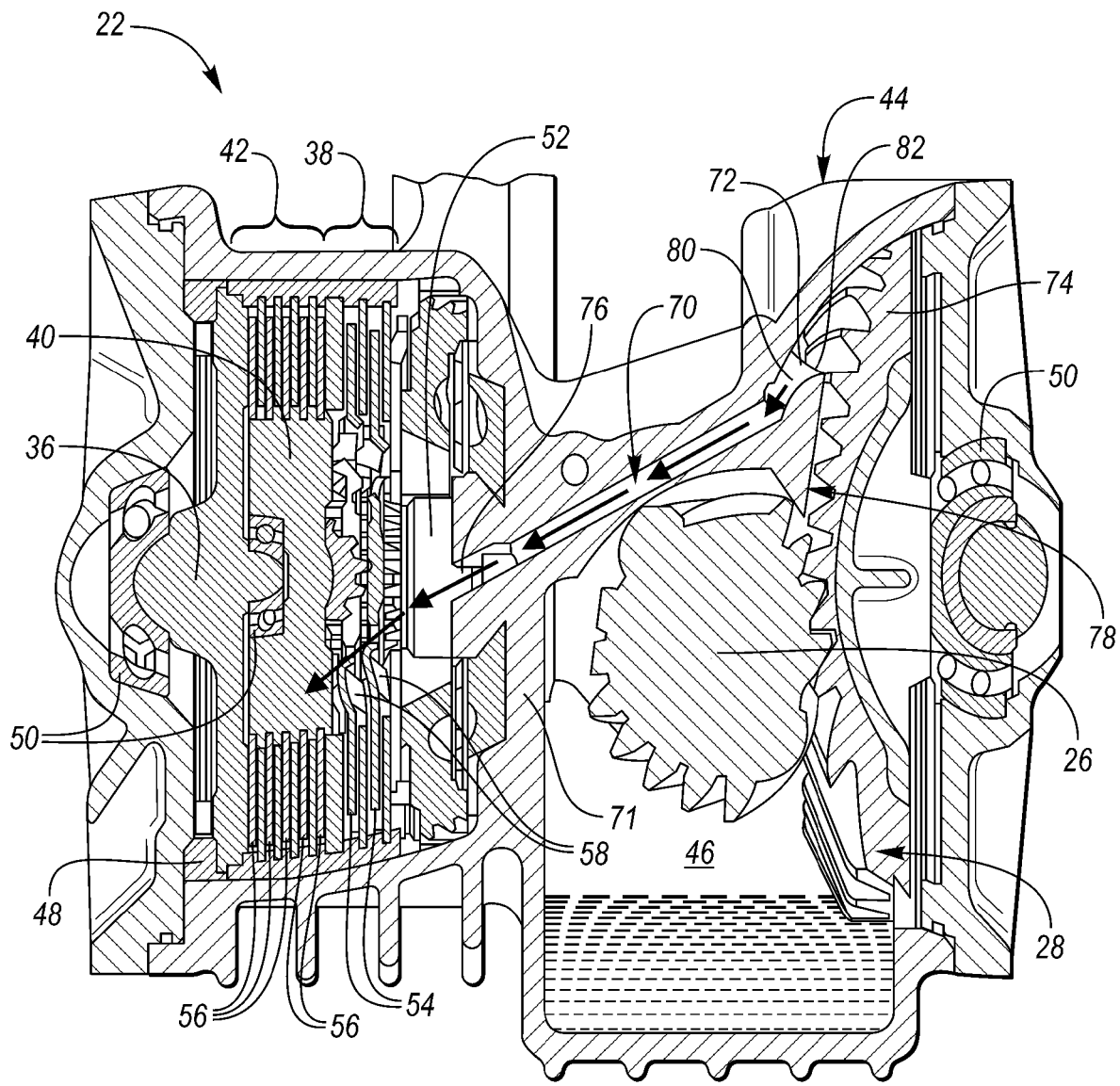
FIG. 4 is a cross-sectional view taken along line 4-4 in FIG. 2.

Referring to FIGS. 3 and 4, cross-sectional views taken along lines 3-3 and 4-4 in FIG. 2 are illustrated, respectively. The housing 44 defines a first cavity 46 (or chamber) and a second cavity 48 (or chamber). The differential gearing may be disposed within the first cavity 46, including the input shaft 26, ring gear 28, carrier 30, spider gears 32, a portion of the first half-shaft 34, and intermediate shaft 40. The carrier 30, first half-shaft 34, second half-shaft 36, intermediate shaft 40, and input shaft 24 (not shown in FIG. 3) may each be supported by bearings 50 that are in turn supported by the housing 44 or other rotating elements (e.g., one of the other shafts) within the housing 44. The seals (not shown) that may be disposed between the housing 44 and the input shaft 24, first half-shaft 34, and second half-shaft 36 may be adjacent to bearings 50. The carrier 30 and the intermediate shaft 40 (both of which may be outputs of the differential gearing) may each extend from the first cavity 46 into the second cavity 48. More specifically, the carrier 30 may include hollow shaft 52 that extends from the first cavity 46 into the second cavity 48 while a middle portion of the intermediate shaft 40 is disposed within the hollow shaft 52.

The first clutch 38 and the second clutch 42 may be both be disposed within the second cavity 48. The first clutch 38 may include a first set (or plurality) of friction plates 54 that are secured to the carrier 30. More specifically, the first set of friction plates 54 may be secured to the hollow shaft 52 of the carrier 30 by a splined connection. The first set of friction plates 54 may be configured to engage separator plates that are secured to the second half-shaft 36 in order to couple the carrier 30 to the second half-shaft 36. The separator plates may be secured to the second half-shaft 36 by a splined connection. The second clutch 42 may include a second set (or plurality) of friction plates 56 that are secured to and end of the intermediate shaft 40 that protrudes out the hollow shaft 52 and is exposed within the second cavity 48. The second set of friction plates 56 may be secured to the intermediate shaft 40 by a splined connection. The second set of friction plates 56 may be configured to engage additional separator plates that are secured to the second half-shaft 36 in order to couple the intermediate shaft 40 to the second half-shaft 36. The additional separator plates may be secured to the second half-shaft 36 by a splined connection.

Figure 5:
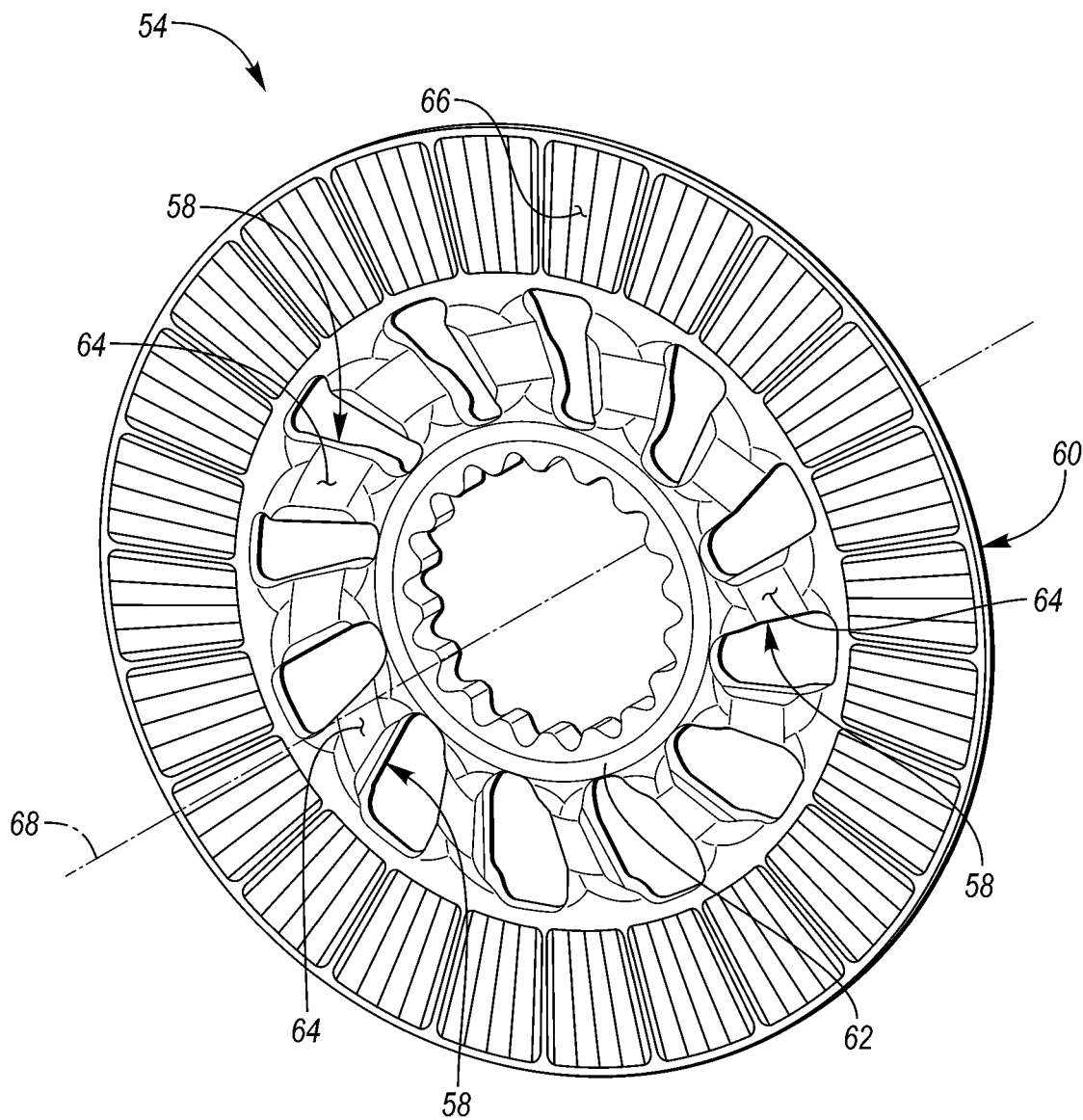
FIG. 5 is a perspective view of a clutch friction plate.

Referring now to FIGS. 3, 4, and 5, at least one of the first set of friction plates 54 includes fanned spokes 58. The fanned spokes 58 secure an exterior friction ring 60 of the friction plate 54 to a central hub 62 of the friction plate 54. The fanned spokes 58 may have angled exterior surfaces 64 that are rotated or twisted relative to a flat exterior surface 66 of the exterior friction ring 60. When the friction plate 54 is rotated about a central axis 68, the fanned spokes 58 will function like fan or impeller blades to move fluids (gaseous or liquid) across the friction plate 54 and through the gaps between adjacent spokes 58.

Referring again to FIG. 4, the housing 44 defines a fluid channel 70 extending between the first cavity 46 and second cavity 48. The housing 44 may include an internal wall 71 that is disposed between the first cavity 46 and the second cavity 48. The internal wall 71 may separate the first cavity 46 from the second cavity 48. The fluid channel 70 may be defined within the internal wall 71 in order to allow lubricating fluid to flow between the first cavity 46 and the second cavity 48. The first set of friction plates 54 of the first clutch 38 may be disposed between the internal wall 71 and the second set of friction plates 56 of the second clutch 42.

An inlet 72 to the fluid channel 70 from the first cavity 46 is defined by the housing 44 adjacent to a top side 74 of the ring gear 28. An outlet 76 from the fluid channel 70 is defined by the housing 44 adjacent to the fanned spokes 58 of the first set of friction plates 54. The fanned spokes 58 of the first set of friction plates 54 are positioned adjacent to the outlet 76 of the fluid channel 70 in order to draw lubricating fluid from the fluid channel 70 into the second cavity 48. The fanned spokes 58 then deliver the lubricating fluid to the center of the first clutch 38 (through the gaps between adjacent spokes 58 of the first set of friction plates 54) and to the center of the second clutch 42. The second set of friction plates 56 of the second clutch 42 may also include spokes that connect central hubs to exterior friction rings, and the lubricating fluid may be delivered to the center of the second clutch 42 through gaps between adjacent spokes of the second set of friction plates 56. The rotation of the first set of friction plates 54 and the second set of friction plates 56 then distributes the lubricating fluid outward to the exterior friction rings of the first set of friction plates 54 and the second set of friction plates 56 through centrifugal force.

The ring gear 28 may be configured to collect lubricating fluid that has gathered at the lower portion of the first cavity 46 (which may be referred to as a sump) and transport the lubricating fluid to the upper portion of the cavity when the ring gear 28 is rotated. The housing may define a scraper 78 that is adjacent to the inlet 72. The scraper may partially define the inlet 72 to the fluid channel 70. The scraper 78 may be configured to remove lubricating fluid that has collected on the ring gear 28 and direct the lubricating fluid into the fluid channel 70 via the inlet 72. More specifically, the scraper 78 has an angled surface 80 that terminates along an edge 82 that is adjacent to the top side 74 of the ring gear 28, and the angled surface 80 scrapes the lubricating fluid off the ring gear 28 along the edge 82 when the ring gear 28 is rotated.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle axle comprising:
a housing defining first and second chambers and a channel extending therebetween;
differential gearing disposed within the first chamber and having an output extending into the second chamber; and
a clutch disposed within the second chamber, configured to selectively couple a half-shaft to the output, and having at least one friction plate that includes fanned spokes positioned to draw fluid from the channel and into the second chamber.

2. The axle of claim 1, wherein the housing includes an internal wall disposed between the first and second chambers, and Wherein the channel is defined within the internal wall.

3. The axle of claim 1, wherein the differential gearing includes a ring gear, and wherein an inlet to the channel from the first chamber is defined by the housing adjacent to a top side of the ring gear.

4. The axle of claim 3, wherein an outlet from the channel to the second chamber is defined by the housing adjacent to the fanned spokes.

5. The axle of claim 4, wherein the at least one friction plate includes a central hub and an exterior friction ring, and wherein the fanned spokes secure the exterior friction ring to the central hub.

6. The axle of claim 3, wherein the housing defines a scraper that is configured to direct fluid from the ring gear into the inlet, the scraper having an angled surface that partially defines the inlet and terminates along an edge adjacent to the ring gear.

7. The axle of claim 1, wherein the output of the differential gearing is a carrier.

8. A vehicle axle comprising:
a housing defining first and second cavities and a channel extending therebetween;
differential gearing disposed within the first cavity and having a carrier extending into the second cavity; and
a first clutch disposed within the second cavity, configured to selectively couple a half-shaft to the carrier, and having friction plates that include fanned spokes positioned to draw fluid from the channel and into the second cavity.

9. The axle of claim 8, wherein an outlet from the channel to the second cavity is defined by the housing adjacent to the fanned spokes.

10. The axle of claim 9, wherein the differential gearing includes a ring gear, and wherein an inlet to the channel from the first cavity is defined by the housing adjacent to a top side of the ring gear.

11. The axle of claim 10, wherein the at least one friction plate includes a central hub and an exterior friction ring, and wherein the fanned spokes secure the exterior friction ring to the central hub.

12. The axle of claim 10, wherein the housing defines a scraper that is configured to direct fluid from the ring gear into the inlet, the scraper having an angled surface that partially defines the inlet and terminates along an edge adjacent to the ring gear.

13. The axle of claim 8 further comprising an intermediate shaft coupled to the carrier via fixed gearing arrangement within first cavity, the intermediate shaft extending from the first cavity and into the second cavity.

14. The axle of claim 13 further comprising a second clutch having a plurality of friction plates, disposed with the second cavity, and configured to selectively couple the intermediate shaft to the half-shaft.

15. The axle of claim 14, wherein the housing includes an internal wall disposed between the first and second cavities, and wherein the channel is defined within the internal wall.

16. The axle of claim 15, wherein the friction plates of the first clutch are disposed between the internal wall and the plurality of friction plates of the second clutch.

17. A differential comprising:
 a housing defining first and second internal cavities and a channel extending therebetween;
 differential gearing disposed within the first cavity; and
 a clutch having friction plates disposed within the second cavity, wherein at least one of the friction plates includes fanned spokes positioned to draw fluid from the channel and into the second cavity.

18. The differential of claim 17, wherein the gearing includes a ring gear, and wherein an inlet to the channel from the first cavity is defined by the housing adjacent to a top side of the ring gear.

19. The differential of claim 18, wherein an outlet from the channel to the second cavity is defined by the housing adjacent to the fanned spokes.

\* \* \* \* \*